United States Patent [19]
Eber

[11] Patent Number: 5,417,083
[45] Date of Patent: May 23, 1995

[54] IN-LINE INCREMETALLY ADJUSTABLE ELECTRONIC EXPANSION VALVE

[75] Inventor: David H. Eber, La Crosse, Wis.

[73] Assignee: American Standard Inc., Piscataway, N.J.

[21] Appl. No.: 300,093

[22] Filed: Sep. 1, 1994

Related U.S. Application Data

[63] Continuation-in-part of Ser. No. 126,625, Sep. 24, 1993, abandoned.

[51] Int. Cl.[6] .......................... F16K 31/02; F16K 5/10
[52] U.S. Cl. .................... 62/528; 251/129.11; 251/208; 251/285
[58] Field of Search .............. 251/129.12, 129.11, 251/285, 208, 266; 62/528; 236/78 C, 75

[56] References Cited

U.S. PATENT DOCUMENTS

| | | | |
|---|---|---|---|
| 1,738,135 | 12/1929 | Bannister | 137/625.31 |
| 3,216,449 | 11/1965 | Maudlin et al. | 251/129.12 X |
| 4,459,819 | 7/1984 | Hargraves | 62/212 |
| 4,523,436 | 6/1985 | Schedel et al. | 62/222 |
| 4,546,795 | 10/1985 | Okamoto et al. | 137/624 |
| 4,554,948 | 11/1985 | Bergmann | 251/304 X |
| 4,593,881 | 6/1986 | Yoshino | 251/124 |
| 4,618,092 | 10/1986 | Fukushima et al. | 62/528 X |
| 4,632,358 | 12/1986 | Orth et al. | 251/117 |
| 4,674,537 | 6/1987 | Bergmann | 137/625.31 |
| 5,011,112 | 4/1991 | Glamm | 251/129 |
| 5,083,745 | 1/1992 | Tischer | 251/129 |

Primary Examiner—William E. Wayner
Attorney, Agent, or Firm—William J. Beres; William O'Driscoll; Peter D. Ferguson

[57] ABSTRACT

A variable flow rate expansion valve designed for in-line installation in a fluid conveying conduit such as between the high pressure condenser and lower pressure evaporator of a refrigeration system includes an integrally defined restrictor disc and a closure disc for controlling the flow of fluid through the valve. The restrictor disc has a first set of flow apertures and the closure disc a second set of flow apertures. The closure disc is rotatably coupled to the restrictor device in a plane parallel to the plane of the restrictor disc and perpendicular to refrigerant flow. A stepper motor is coupled to the closure disc through a linear actuator. Movement of the linear actuator causes the closure disc to rotate relative to the restrictor disc such that the flow apertures of the closure disc are selectively brought into and out of registry with the apertures of the restrictor disc.

29 Claims, 5 Drawing Sheets

IN-LINE INCREMETALLY ADJUSTABLE ELECTRONIC EXPANSION VALVE

This continuation-in-part patent application derives from U.S. patent application Ser. No. 08/126,625, filed Sep. 24, 1993, now abandoned.

TECHNICAL FIELD

This invention pertains to expansion valves for use in refrigeration systems. More particularly, this invention relates to an in-line electrically actuated refrigeration system expansion valve that provides for incrementally adjustable refrigerant flow control between the high and the low pressure sides of a refrigeration system.

BACKGROUND OF THE INVENTION

Conventional refrigeration and air conditioning systems typically utilize a series of recirculating fluid loops to cool a space by transferring the heat from the space through the fluid loops and ultimately to a heat sink such as water or ambient outside air. A commercial air conditioning system, for instance, typically includes a water chiller having an evaporator at its low pressure side, a condenser at its high pressure side, a compressor to boost the pressure of refrigerant as its flows from the evaporator to the condenser and an expansion valve to meter refrigerant from the high pressure condenser to the low pressure evaporator.

In a first fluid loop, water passes through the chiller evaporator, where it is cooled in a heat exchange relationship with relatively cooler system refrigerant, before being directed to a location where it absorbs heat and is returned to the evaporator. In "flooded design" evaporators, the water in the chilled water loop flows through the tubes of the evaporator and liquid refrigerant surrounds the outside of the tubes. The cooler liquid refrigerant surrounding the tubes absorbs heat energy from the relatively warmer water, thereby chilling the water.

During the removal of heat energy from the warm water, the liquid refrigerant vaporizes. The vaporized refrigerant is pumped out of the evaporator by the compressor which compresses the refrigerant, raising its pressure and temperature. The high temperature refrigerant then flows to the system condenser where its heat is rejected, most typically, to water in a second fluid loop or directly to ambient air.

As the refrigerant is cooled in the condenser it changes state from a hot gas to a warm, relatively high pressure liquid which is metered through a pressure reducing expansion valve, to the evaporator. The expansion valve maintains the pressure differential between the high and low pressure sides of the refrigeration system.

The pressure of the refrigerant is controllably reduced as it passes through the expansion valve to ensure that the refrigerant will efficiently vaporize and absorb heat from the relatively warm water flowing through the evaporator. The cycle is completed, and ready to be repeated, when the liquid refrigerant flows, at reduced pressure, through the expansion valve to the evaporator.

The amount of liquid refrigerant introduced into the evaporator should be that amount which can "wet" the surface area of the tubes of the evaporator without having more or less liquid refrigerant in the evaporator than is needed for a particular cooling load. Accordingly, the expansion valve should be adjustable, on command, to control the amount of liquid refrigerant introduced into the evaporator. The expansion valve can also be used to shut off the flow of refrigerant through the chiller such as for purposes of isolating chiller components for maintenance.

Electric, rotary actuated, incremental valves suitable for use as expansion valves in refrigeration systems are typically comprised of two types. In both types, the valve is operated by a stepping motor which provides incremental rotary motion which is then translated to incremental linear motion to actuate a valve element.

In the first type of valve, the valve element is linearly driven against the valve seat to sealingly cover an aperture to prevent fluid flow therethrough. Alternatively, the valve element is driven linearly away from the seat to open the valve by incrementally opening the aperture to flow. The distance of the valve element from the valve seat is determinative of the flow area available through the valve, up to a maximum which is restricted only by the size of the aperture itself.

This type of rotary actuated, linearly driven expansion valve may stick due both to the friction between valve parts and the viscosity of contaminants collected upon the valve body. Overcoming this tendency to stick can require the use of oversized, more costly motors.

The ability to carefully control the system is decreased because the actuator may fail to overcome the sticking of the valve element, for one or more actuating pulses or steps of the motor, causing the valve element to be improperly positioned. The valve controller, having sent a specified number of pulses intended to actuate the valve to a desired opening, will in fact have actuated the valve to a smaller degree than calculated or desired. The system then indicates the need for further movement of the valve element and the controller begins to "hunt" for the appropriate valve setting.

In a second type of rotary expansion valve, the valve element is a member which is linearly driven normal to a flow aperture and the direction of flow of refrigerant through the valve. In this type of valve, the amount of flow is determined by the extent of the area of the aperture which is uncovered by the valve element.

In addition to the potential "hunting" problems described above, this second type of rotary actuated expansion valve is typically comprised of many relatively small parts which must be machined to close tolerances to prevent fluid leakage therethrough and to improve operating characteristics. Such close tolerance machining is often expensive and time consuming, as is the assembly of valves containing such parts.

Furthermore, this type of rotary actuated expansion valve often includes a relatively large number of elastomeric seals to prevent leakage past the valve element and oftentimes, one or more springs having a relatively large traverse distance, all of which are susceptible to wear and breakage. These items tend to substantially decrease the reliability of the valve.

It is an object of the present invention to provide a rotary actuated expansion of relatively rugged design and simple construction that avoids the problems inherent in stepper motor driven expansion valves having a linearly driven valve element.

It is a further object of the present invention to provide a rotary actuated expansion valve which is highly reliable yet relatively low in manufacturing and maintenance requirements and costs.

It is yet another object of the invention to provide such a valve which is capable of being mass produced.

It is yet another object of the invention to provide such a valve which is a low friction device.

It is yet another object of the present invention to provide such a valve as will appropriately respond to a controller input to permit smooth, pulse-free fluid flow through the valve.

It is yet another object of the invention to provide such a valve which is suitable specifically for such applications as an expansion valve in an air conditioning or other type of refrigeration system, particularly where such system includes a flooded evaporator.

These and other objects of the present invention will be apparent from the attached drawings and description of the preferred embodiment which follows.

SUMMARY OF THE INVENTION

The present invention is a stepper motor driven variable flow rate expansion valve for a refrigeration system. The valve has a housing which facilitates its mounting in-line in refrigerant piping and defines a flow passage therethrough. A restrictor is integrally formed within the valve housing to control fluid flow.

First flow apertures are defined in the restrictor and a closure device, the purpose of which is to vary the degree of opening of the flow apertures in the restrictor in operation, is rotatably coupled to the restrictor. Second flow apertures are defined in the closure device which are capable of being rotatably positioned between an open position in full registry with the restrictor flow apertures and a closed position where the restrictor flow apertures are closed to flow.

The closure member rotates in a plane generally transverse to the flow of refrigerant therethrough and is spaced away from the restrictor so that a leakage path is at all times maintained, even if the apertures of the closure device and restrictor are out of registry. This permits pressure equalization across the valve and in the refrigeration system in which it is employed subsequent to the shutdown of the refrigeration system.

A drive mechanism is operably coupled to the closure device such that linear motion of the drive mechanism produces rotational motion of the closure device so as to position the closure device and its flow apertures between the fully open and fully closed positions. A stepping motor is connected to the drive mechanism and provides a rotational motive force which causes the linear movement drive mechanism.

In-line installation of the valve in refrigerant piping reduces the internal valve friction which results from the impingement of liquid refrigerant on its components and the need, as in some expansion valves, to change refrigerant flow direction within the valve housing. The in-line characteristic and unique features of the expansion valve hereof overcome the problems of valve binding and unresponsiveness of previous stepper motor driven expansion valves without the employment of costly, oversized drive motors.

The present invention is of relatively uncomplicated but unique design, both as to its reduced number of parts and the relative lack of a requirement for critical tolerances as between the various parts. The design provides for ease and reduced cost of manufacture as well as low maintenance in service. Low maintenance requirements are especially desirable since repair of an expansion valve requires that the refrigeration system be taken out of service thereby possibly interrupting the air conditioning of a commercial building or the provision of chilled water for a manufacturing process.

DESCRIPTION OF THE PREFERRED EMBODIMENT

Figure 1:
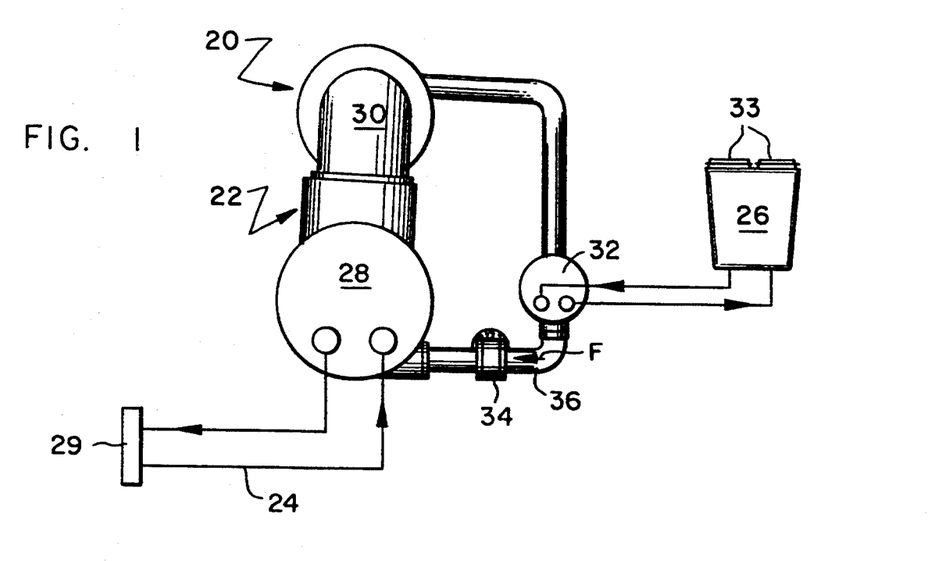
FIG. 1 is a generally schematic representation of a chiller-based refrigeration system.
Figure 2:
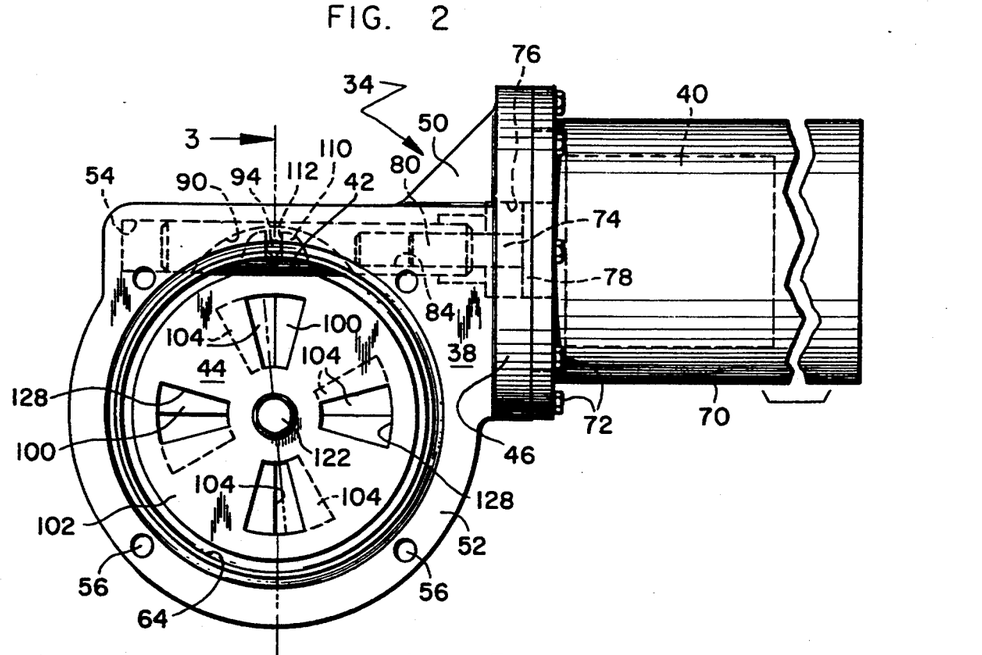
FIG. 2 is an elevational view of the expansion valve of the present invention from the input side of the valve, with the stepper motor and valve drive system depicted in phantom.

Referring first to FIG. 1, an air conditioning system is shown generally at 20 and consists of three major components; chiller 22, chilled water loop 24, and heat rejection loop 26. Chiller 22 cools the chilled water that ultimately cools the air conditioned space or process serviced by the chilled water loop 24. The chilled water loop 24 conveys chilled water from chiller 22 to the coil 29 in a space, room, process or zone that is to be temperature conditioned. Heat rejection loop 26 cools the heated chiller refrigerant by conveying a portion of the refrigerant's heat to a heat sink such as ambient air or water.

Chiller 22 has four main components; evaporator 28, compressor 30, condenser 32, and expansion valve 34. Evaporator 28 conveys cool, liquid refrigerant into heat exchange contact with water which is to be chilled. As the refrigerant absorbs heat from the water in the evaporator the refrigerant vaporizes. Compressor 30 draws the refrigerant vapor from evaporator 28 and compresses it thereby raising both the temperature and the pressure of the refrigerant.

The hot, gaseous refrigerant is then pumped by compressor 30 to condenser 32 where it is cooled and condenses to a warm liquid. The liquid refrigerant, which is still at relatively high pressure, then flows to expansion valve 34.

Still referring to FIG. 1, expansion valve 34 causes a drop in pressure in the refrigerant as it passes through it. A portion of the refrigerant flashes to vapor but the bulk of the refrigerant passes through the valve in the liquid state.

In chilled water loop 24, relatively warm water returning from coil 29 associated with the space or process which is to be temperature conditioned passes through evaporator 28 and is cooled by the chiller system refrigerant. Heat rejection loop 26 in building air conditioning systems is often a rooftop system which includes a cooling tower. Water that has been heated by the hot refrigerant in condenser 32 is drawn from the condenser and is pumped through heat rejection loop 26.

Fans 33 draw ambient air over a heat exchanger coil (not shown) in the cooling tower thereby cooling the water in a heat exchange process with the ambient air. The cooled water is recirculated to condenser 32 in a continuous refrigerant cooling process.

Referring additionally now to FIGS. 2–7, expansion valve 34 is disposed in the pipe 36 which connects condenser 32 to evaporator 28. Refrigerant flow direction in pipe 36 is as indicated by the arrow F depicted in FIGS. 1 and 4. Valve 34 acts as a boundary between the high and low pressure sides of chiller 22 and performs the function of delivering liquid refrigerant to evaporator 28 in precisely metered quantities. Expansion valve 34 includes valve casing 38 and three main functional components, motor 40, linear actuator 42, and fluid metering section 44.

Valve casing 38 is a structural member, typically cast as a single unit, and has a motor support flange 46 which is connected by webbing 50 to a valve housing 52. Valve housing 52 has an internal bore 54 that houses linear actuator 42. The axis of bore 54 is oriented on an extension of the central axis of motor 40 and is preferably defined in the upper portion of the valve housing.

Valve housing 52 also includes mounting bores 56 that are located so as to align with similar bores in pipe flanges 58 of pipe 36 to permit the in-line installation of the valve in the refrigerant piping. Pipe flanges 58 are typically secured to valve housing 52 by bolts 60 making the valve easily removeable for maintenance if necessary.

The inner circumference 62 of valve housing 52 defines an inlet recess 64 and an outlet recess 66. Inlet recess 64 and outlet recess 66 are in flow communication through the housing and define a fluid passageway through valve casing 38. Preferably, inlet recess 64 is of greater diameter than outlet recess 66 so that a lip 67 is formed at the juncture of inlet and outlet recesses.

Figures 5, 6, 7:
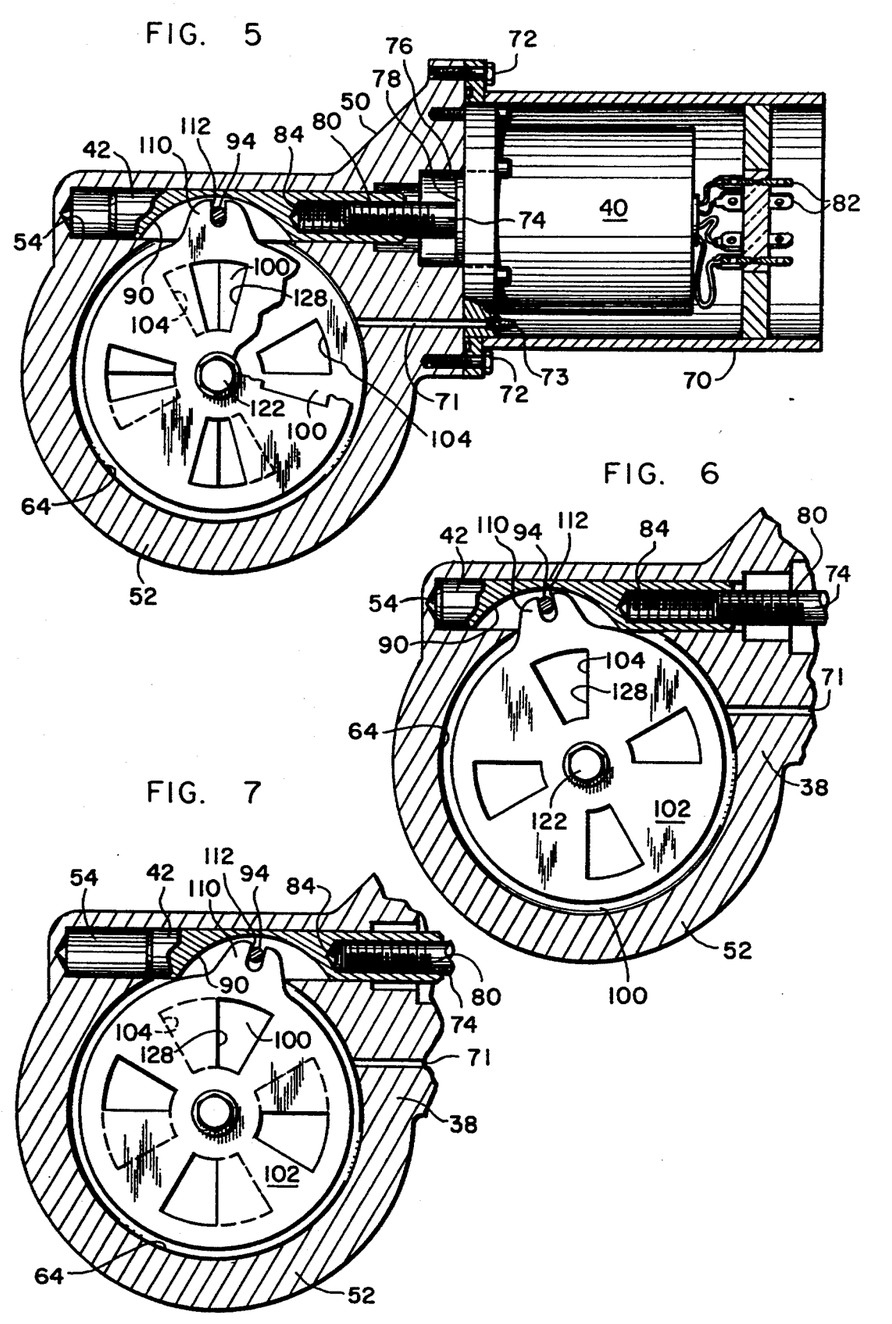
FIG. 5 is a sectional view taken along line 5—5 of FIG. 4 with a portion of the rotating metering disc broken away to expose a portion of the fixed metering disc.
FIG. 6 is a partial sectional view of the expansion valve showing the fluid metering portion of the valve in the fully opened position.
FIG. 7 is similar to FIG. 6, but with the fluid metering portion of the valve in the fully closed position.

Motor case 70 is affixed by bolts 72 to motor flange 46 of valve casing 38. As is best illustrated in FIG. 5, vent channel 71 extends between the interior of the motor case 70 and the interior of valve casing 38 and a debris filter 73 is disposed within the channel.

Motor 40 is a bi-directional, incremental motor, also known as a stepping or stepper motor, and provides rotary motion in equal increments in response to the application of an external control or power signal. Stepping motors such as motor 40 are well-known and a detailed discussion regarding motor 40 is not provided herein.

Figure 3:
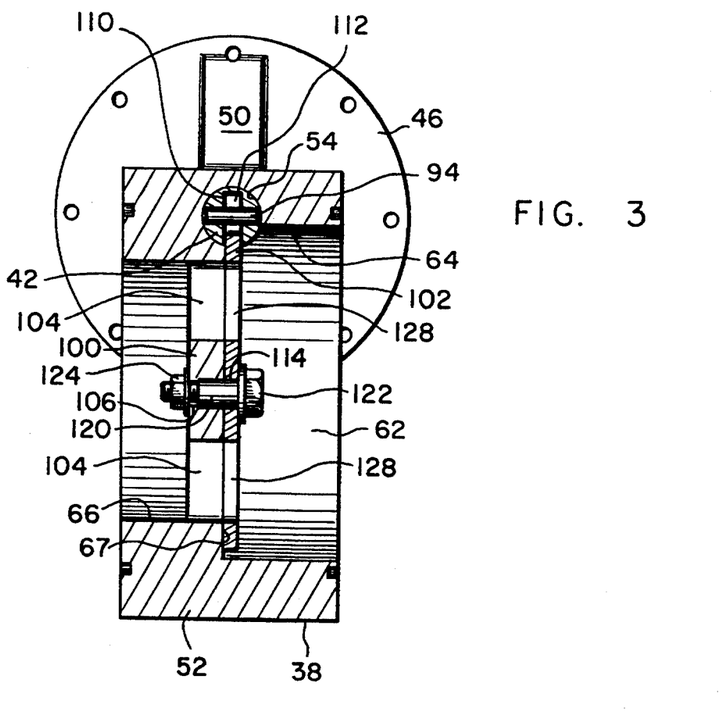
FIG. 3 is a sectional view taken along line 3—3 of FIG. 2.

Drive shaft 74 of motor 40 projects through central bore 76 in motor flange 46 and is aligned with the axis of bore 54. Motor bearing 78, which may be a roller or sleeve bearing, is disposed in bore 76 and rotatably supports drive shaft 74. The end portion 80 of drive shaft 74 is threadably engaged with linear actuator 42 and power is provided to motor 40 via electrical leads 82.

Linear actuator 42 is preferably a polished metal rod that is closely slideably engaged within bore 54. Actuator 42 is sufficiently shorter in length than the depth of bore 54 to permit it to freely slide back and forth over a substantial range within bore 54.

Threaded axial bore 84 within linear actuator 42 cooperatively engages the threads of the end portion 80 of drive shaft 74. The depth of threaded bore 84 is greater than the length of the threaded portion 80 of the drive shaft to facilitate the full extent of the linear traverse of actuator 42 in bore 54.

Figure 4:
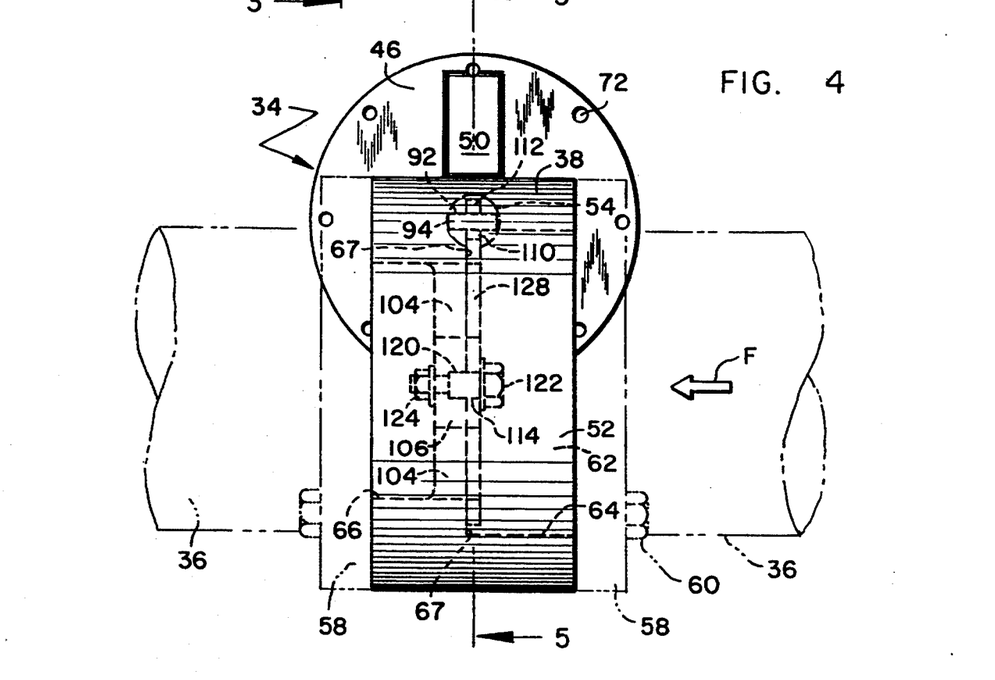
FIG. 4 is a side elevational view of the valve, with the refrigerant line connected to the valve and the valve metering portion depicted in phantom.

A curvilinear slot 90 is milled into linear actuator 42. Referring to FIG. 4, it will be seen that slot 90 extends through approximately half the width of the linear actuator and that a bore 92 opens into slot 90 at a right angle to the axis of actuator 42. Drive pin 94 is press fit into bore 92 and is of a length approximately equal to the diameter of linear actuator 42. Pin 94 projects into slot 90 at right angles to the axis of the linear actuator.

The fluid metering section 44 of expansion valve 34 has two main portions, a fixed disc portion 100 and a rotating disc 102. Preferably, fixed disc portion 100 is formed in the same operation in which the remainder of housing 52 is formed and is an integral part of the housing. Fixed disc 100 has at least one flow aperture 104 that restricts fluid flow therethrough.

In the embodiment shown in FIGS. 2–7, there are four flow apertures 104 formed at 90 degree intervals around fixed disc portion 100. The shape of flow apertures 104 is defined by two spaced apart radii subtended by two arcs of varying radial distance from the center of fixed disc portion 100. Fixed disc 100 additionally has a central bore 106 which provides a mounting aperture for rotating disc 102.

Rotating disc 102 is preferably circular in shape and has a projecting peripheral edge 110 that extends beyond the circumference of disc 102. Peripheral edge 110 has an outwardly opening U-shaped slot 112 that engages drive pin 94.

The circumference of rotating disc 102 is slightly less than the circumference of inlet recess 64 formed so that disc 102 is free to rotate within the inlet recess. Preferably, the circumference of disc 102 is somewhat greater than the circumference of outlet recess 66 so that the radially exterior portion of rotating disc 102 is in sliding engagement with lip 67. Rotating disc 102 has a central bore 114 that provides for the rotational mounting of disc 102 to fixed disc portion 100.

A thrust bearing 120, having a central bore therethrough is mounted in central bore 106 of fixed disc 100. Bore 114 of rotating disc 102 is positioned in registry with the bore of bearing 120 and the combination of bolt 122, passing through bore 114, bearing 120 and lock nut 124 rotatably secures disc 102 to fixed disc portion 100.

Rotating disc 102 defines at least one flow aperture 128. Apertures 128 are preferably of the same size, shape and radial distance from the central axis of rotating disc 102 as flow apertures 104 are in relation to fixed disc portion 100. Accordingly, at a predetermined point of rotation, apertures 128 of disc 102 are brought into full coincidental registry with apertures 104 of fixed disc portion 100.

Linear actuator 42 has limited translational authority within bore 54 with which to rotate disc 102. Accordingly, the relationship of apertures 104 of fixed disc 100, apertures 128 of rotating disc 102, and peripheral flange 110 of rotating disc 102 must be such that at one extreme of the traverse of linear actuator 42, apertures 128 and apertures 104 are in full registry while at the second extreme of traverse, apertures 128 are entirely out of registry with apertures 104. Apertures 104 are thus fully closed at the second extreme and fluid flow through expansion valve 34 is prevented. The fully opened position previously described is depicted in FIG. 6 and the fully closed position in FIG. 7.

Figures 8, 9, 10:
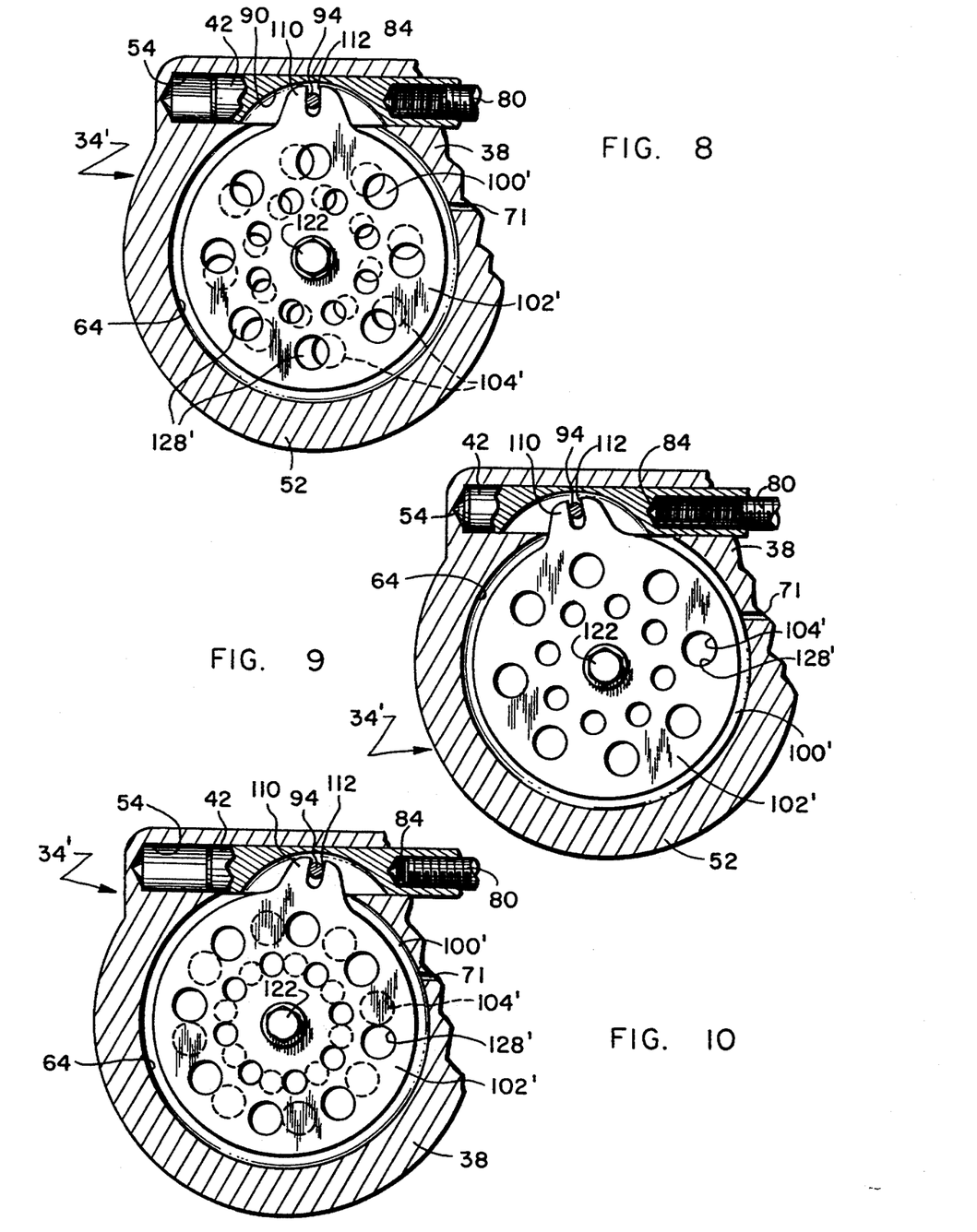
FIG. 8 is a partial sectional view of the metering portion of an expansion valve of the present invention depicting an alternate embodiment of the metering disc apertures.
FIG. 9 is similar to FIG. 8, but with the metering portion of the valve in the fully opened position.
FIG. 10 is similar to FIG. 8, but with the valve metering portion in the fully closed position.

An alternative embodiment of an expansion valve of the present invention is depicted in FIGS. 8, 9 and 10. This embodiment differs from the previously described embodiment only in that apertures 104' and apertures 128' comprise a plurality of circular apertures. Other embodiments using different shaped, sized and oriented apertures are contemplated. Varying the nature of the apertures provides an opportunity to vary the overall range and/or rate of cumulative opening or closing of the flow apertures and can be used to change the relationship between the rate or extent of rotation of the rotating disc 102' and the flow area presented across the operating range of the valve.

FIG. 8 depicts flow apertures 104' in a partially opened position while FIG. 9 depicts apertures 128' in full registry with apertures 104' in the fully open position. FIG. 10 depicts the apertures 104' in phantom behind rotating disc 102' in the fully closed position. The other elements of the valve 34' depicted in FIGS. 8-10 are identical to the elements described in conjunction with the description of the first embodiment.

In operation, expansion valve 34 is installed in pipe 36 which conveys liquid refrigerant from condenser 32 to evaporator 28. The amount of refrigerant required by evaporator 28 is determined by the cooling load air conditioning system 20 is experiencing at any given time. Responsive to that cooling load, a control system (not shown) provides commands to motor 40. The greater the cooling load, the greater the amount of refrigerant flow through expansion valve 34 that is needed.

Motor 40 is bi-directional, thereby providing for both opening and closing of expansion valve 34. An input command from the control system causes the motor 40 and its drive shaft 74 to rotate in a fixed increment of angular displacement. This rotation causes threaded portion 80 of drive shaft 74 to rotate incrementally within axialy bore 84 of linear actuator 42. Since linear actuator 42 is constrained from rotating, the incremental rotation of drive shaft 74 causes linear actuator 42 to move axially in bore 54 which causes disc 102 to rotate to a more opened or closed position, as the case may be. In sequence then, the incremental rotational motion of motor 40 produces linear motion of linear actuator 42 which in turn causes the rotational motion of disc 102.

Frictional forces caused by the impact of high pressure refrigerant fluid on rotating disc 102 are borne by thrust bearing 120 and by the periphery of rotating disc 102 which is in sliding engagement with lip 67. It is to be noted that expansion valve 34 does not employ discrete seal elements between rotating disc 102 and fixed disc 100. Accordingly, when expansion valve 34 is in the closed position, there is the potential for a small but tolerable amount of leakage through expansion valve 34.

It is also to be noted that FIGS. 8, 9, and 10 depict apertures 104' and 128' as circular openings, with each aperture 104' being paired with a corresponding aperture 128'. The circular apertures of the embodiment depicted in these figures are in contrast to the apertures 104 and 128 of the previously depicted embodiment.

Apertures 104 and 128, as described with respect to FIGS. 2-7, are defined by two sides that are radii and two sides that are arcs of the respective discs 100 and 102. Accordingly, as apertures 128 are rotated into or out of registry with apertures 104, each incremental rotational step of the drive motor produces a generally linear increase or decrease in the size of the overall flow opening presented by the two discs.

The linear change in opening size is in contrast to the result obtained when using the circular openings of apertures 104' and 128' of FIGS. 8-10 where, since two circular apertured are being brought into and out of registry, the incremental angular rotation of disc 102' produces relatively little change in the overall flow area through the valve when apertures 128' are nearly fully in or out of registry with apertures 104'. This circumstance occurs at the extreme ends of the stroke of linear actuator 42.

At the midpoint of the rotational motion of apertures 128' with respect to apertures 104', the greatest rate of change of the cumulative aperture opening of the valve is achieved. Accordingly, the change of the effective flow area achieved per motor step and per the incremental angular change of position of rotating disc 102' is magnified, as is valve responsiveness, in the most critical portion of the valve's operating range.

As depicted in FIGS. 8, 9, and 10, there are a relatively large number of apertures 104' and 128' symmetrically disposed around discs 100' and 102'. An effect of this arrangement, like that of the FIGS. 2-7 embodiment, is to evenly distribute the thrust loads imposed on the structure of rotating disc 102'. Accordingly, no bending moments are produced on bolt 122 which would tend to cause binding of disc 102' and inhibit its free rotation.

Figures 11, 12:
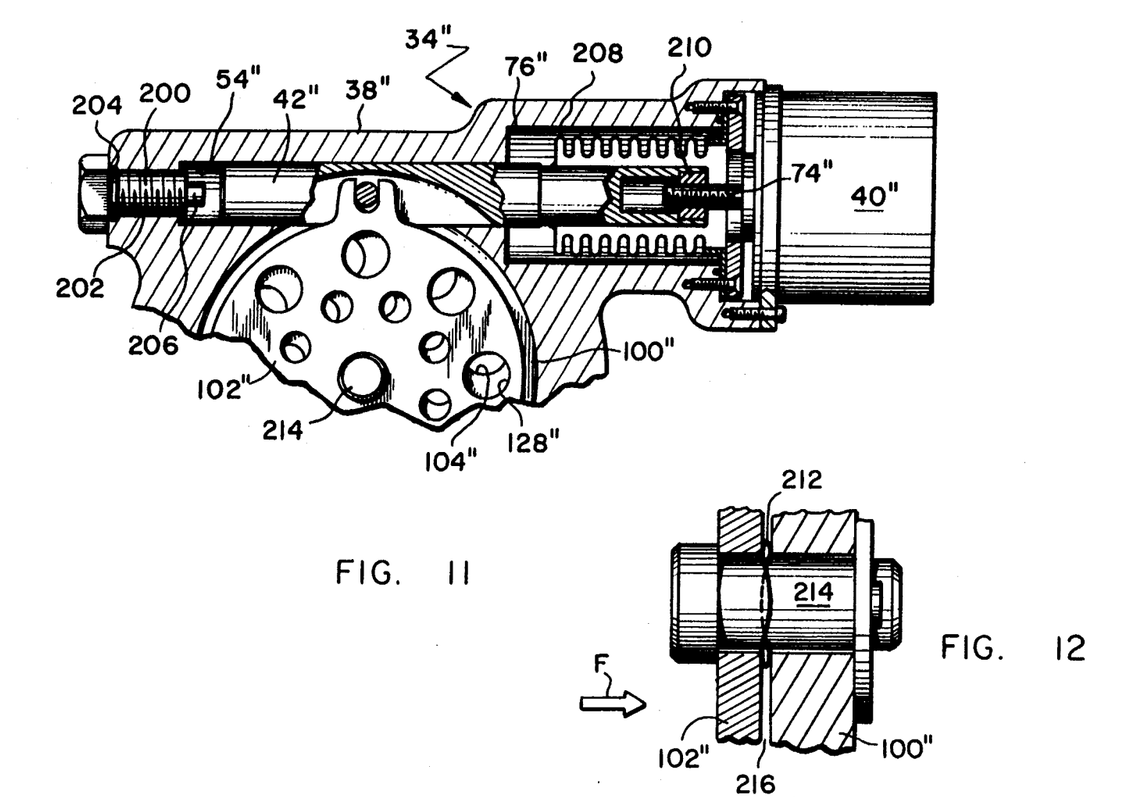
FIG. 11 is a still further embodiment of the present invention in which features applicable to the earlier embodiments are illustrated.
FIG. 12 illustrates the disposition of a spacer between the closure member and restrictor portions of the present invention.

Referring now to the embodiment of FIG. 11, modifications/features also applicable to the earlier discussed embodiments are illustrated which may, in certain instances, be advantageous. In the embodiment of FIG. 11, valve 34" includes a stop member 200 by which the extent of travel of linear actuator 42Δ in bore 54" is limited. In that regard, stop member 200 is threadably inserted into a cooperating threaded co-axial extension 202 of bore 54". A seal, such as O-ring 204 may be employed to provide a fluid tight seal between stop member 200 and valve casing 38".

Stop member 200 has a stop portion 206 of a predetermined length which projects into bore 54". Actuator 42" will come to bear against the end of linear actuator 42" as it travels axially within bore 54" away from motor 40".

By varying the overall length of member 200, the maximum extent to which rotating disc 102" is permitted to bring the apertures of the fixed and rotating disc into registry and, therefore, the maximum flow rate permitted through the valve, can be limited in view of the size/capacity of the system in which valve 34" is employed. As a result, the same single standard valve can be used in a wide variety of applications and chiller sizes, all through the selection and use of a very inexpensive and readily accessible bolt-like part.

Also with respect to FIG. 11, the employment of a bellows member 208, disposed in bore 76" in valve casing 38" is illustrated. Bellows 208 is sealingly penetrated by linear actuator 42″ and is attached thereto for expansion or contraction in accordance with the direction of movement of the actuator. The interior of bellows 208 is therefore isolated from the remainder of the interior of bore 76″.

By the use of bellows member 208, the need for a motor case 70, which is in communication through a vent channel with the interior of the valve member of the previous embodiments, is dispensed with. Since motor case 70 would typically be a relatively very heavy and expensive cast piece, the use of bellows 208 as an isolation boundary may be advantageous from both a weight and cost standpoint. Also, by the use of bellows 208, direct access to motor 40″, without the need to remove a housing which is in communication with the interior of valve 34″ through a vent passage, is made available.

FIG. 11 also illustrates the use of a threaded insert 210 in the end of linear actuator 42″ which engages drive shaft 74″ of motor 40″. By the use of a threaded, press fit insert, the need to threadably machine a bore into the end of linear actuator 42″ is dispensed with which, in some circumstances, may provide a cost benefit with respect to the production of valve 34″. Also, the insert may permit the valve to be more tolerant with respect to the alignment of the linear actuator and motor drive shaft thereby reducing the likelihood that linear actuator 42″ will stick or bind as it traverses bore 54″.

Finally and as is indicated above, in the earlier embodiments the downstream face of the rotating disc portion of the valve is in sliding engagement with the upstream face of the fixed disc portion. In those embodiments, the force on the upstream face of the rotating disc portion caused by the transverse impact of high pressure fluid refrigerant flow F impinging on it are borne by a thrust bearing.

Referring now to both FIGS. 11 and 12, a spacer 212 is disposed between rotating disc portion 102″, which is mounted for rotation on pin 214, and fixed disc portion 100″ of valve 34″. As a result, rotating disc portion 102″, in this embodiment, is slightly disengaged from and is not in slideable contact with the fixed disc portion due to the creation of gap 216. Therefore, even when apertures 104″ and 128″ of the fixed and rotating disc portions are entirely out of registry, a leakage path is maintained around the periphery of rotating disc portion 102″ and through its apertures into intervening gap 216 and thence, through apertures 104″ of fixed disc portion 100″. This permits the higher, upstream pressure in a refrigeration system in which valve 34″ is employed to equalize across the valve when the refrigeration system shuts down.

By spacing rotating disc portion 102″ away from fixed disc portion 100″, the existence of a leakage path through valve 34″ by which system pressures can equalize when the apertures of the fixed and rotating disc portions of the valve are out of registry is assured but in a manner which does not appreciably affect the operation or accuracy of the valve with respect to its refrigerant flow modulating function. When apertures 104″ and 128″ are in registry to any degree, the flow of refrigerant through valve 34″ will be through the apertures with little, if any, refrigerant flow occurring past and/or around the periphery of rotating disc member 102″. The use of a spacer 212 which biases rotating disc portion 102″ away from fixed disc portion 100″, such as a Belville spring or wavy washer, will facilitate the rotation of rotating disc portion 56 as against the transverse impact of refrigerant flow F on its upstream face.

While the present invention has been described in terms of preferred and alternative embodiments, it will be appreciated that other modifications and versions of the valve of the present invention will be apparent to those skilled in the art given the teachings herein. Accordingly, the scope of the present invention should not be limited other than in accordance with the language of the claims which follow.

What is claimed is:

1. A refrigerant expansion valve comprising:
 a motor, said motor being a bi-directional motor having a drive shaft;
 a housing said housing defining at least one aperture;
 a rotating member having a peripheral edge exposed to refrigerant flow through said valve, said rotating member disposed in a plane generally perpendicular to the direction of flow through said valve and defining at least one aperture, the degree to which said aperture of said rotating member is in registry with said aperture of said housing being determinative of the amount of refrigerant flow through said valve; and
 an actuator, said actuator being operably coupled to said rotatable shaft member of said motor and to said rotating member, the rotation of said motor shaft causing linear motion of said actuator in said valve and said linear motion of said actuator causing rotary motion in rotating member.

2. The expansion valve according to claim 1 wherein each of said at least one aperture in said rotating member and each of said at least one aperture in said housing are of the same size and shape so that when at least one aperture in said rotating member and said at least one aperture in said housing are in registry the peripheral edges thereof are coincidental with respect to the flow of refrigerant through said valve.

3. The expansion valve according to claim 1 further comprising means for limiting the axial movement of said actuator.

4. The expansion valve according to claim 3 wherein said means for limiting the axial movement of said actuator limits the movement of said actuator such that the actuator is not permitted to move to an extent which puts said at least one aperture in said rotating member and said at least one aperture in said housing in full registry, thereby limiting the amount of flow through said valve to an amount which is less than the amount of flow which would occur if said at least one aperture in said fixed member were in full registry with said at least one aperture in said rotating member.

5. The expansion valve according to claim 4 wherein said valve housing defines a bore in which said actuator moves, said means for limiting the movement of said actuator comprising a member having a predetermined length, said member projecting into the path of movement of said linear actuator in said bore.

6. The expansion valve according to claim 1 wherein the peripheral edge of said rotating member is radially outermore than the outermost edge of any of said at least one aperture in said housing and wherein said rotating member is upstream of the portion of said housing which defines said at least one aperture with respect to the direction of refrigerant flow through said valve, said rotating member being spaced from said housing so that a leakage path between said rotating member and said housing is maintained even when said at least one aperture of said housing is out of registry with said at least one aperture of said rotating member.

7. The expansion valve according to claim 1 wherein the shape of said at least one aperture in said rotary member and said housing is such that the rate of flow through said valve varies non-linearly as the degree of registry of said apertures changes.

8. The expansion valve according to claim 1 wherein the shape of said at least one aperture of said housing and said rotating member is such that the rate of flow through said valve varies linearly as the degree of registry of said apertures changes.

9. The expansion valve according to claim 1 wherein said shaft of said motor has a threaded portion and wherein said rotating member is spaced from said housing so that a leakage path between said rotating member and said housing is maintained even when said at least one aperture of said housing is out of registry with said at least one aperture of said rotating member.

10. The expansion valve according to claim 9 further comprising a bellows, said bellows being attached to said actuator for expansion and contraction in accordance with the direction of linear movement of said actuator, said threaded portion of said shaft being in threadable engagement with said actuator and disposed interior of said bellows means.

11. The expansion valve according to claim 10 wherein said rotatable shaft of said motor has a threaded portion and a threaded insert disposed in said actuator, said threaded portion of said shaft being in threadable engagement with said insert.

12. The expansion valve according to claim 9 further comprising means for limiting the axial movement of said actuator.

13. The expansion valve according to claim 12 wherein said means for limiting the movement of said actuator limits the movement of said actuator such that the actuator is not permitted to move to an extent which puts said at least one aperture of said rotating member and said at least one aperture of said housing in full registry, thereby limiting the amount of flow through said valve to an amount which is less than the amount which would occur if said at least one aperture of said housing were in full registry with said at least one aperture of said rotating member.

14. A refrigerant expansion valve comprising:
a motor, said motor being a bi-directional motor having a rotatable drive shaft;
a housing, said housing defining a plurality of apertures in said valve;
a plate mounted for rotary motion within said valve, said plate defining a plurality of apertures; and
an actuator, said actuator disposed in said valve for linear movement in a plane generally coincident with the plane of said plate and being operably coupled to both said rotatable drive shaft of said motor and to said plate, rotation of said motor drive shaft causing said actuator to move linearly within said valve in a plane generally coincident with the plane of said plate, said linear movement of said drive shaft causing rotary motion of said plate, the degree of registry of said apertures in said plate with respect to said apertures in said valve being determinative of the amount of refrigerant flow through said valve; and means for isolating said drive shaft of said motor from refrigerant flowing through said valve.

15. The expansion valve according to claim 14 wherein said plate is spaced apart from said housing and wherein said plate and said housing are disposed in a plane generally perpendicular to the flow of refrigerant through said valve.

16. The expansion valve according to claim 15 wherein said apertures defined in said plate and the apertures in said housing are of the same size and shape so that when said apertures are in registry, the peripheral edges thereof are coincident with respect to the direction of flow of refrigerant through said valve.

17. The expansion valve according to claim 14 further comprising means for limiting the axial movement of said actuator.

18. The expansion valve according to claim 17 wherein said means for limiting the axial movement of said actuator limits the movement of said actuator such that the actuator is not permitted to move said apertures of said plate into full registry with said apertures of said housing, thereby limiting the amount of flow through said valve to an amount which is less than the amount of flow which would occur if said apertures were in full registry.

19. The expansion valve according to claim 18 wherein said valve housing defines a bore in which said actuator moves, said means for limiting the movement of said actuator comprising a member of a predetermined length, said member projecting into the path of movement of said linear actuator.

20. The expansion valve according to claim 14 wherein the peripheral edge of said rotating plate is radially outermore than the outermost edge of any of said plurality of apertures defined by said means for defining a plurality of apertures in said valve.

21. The expansion valve according to claim 20 wherein the shape of said apertures in said plate and the shape of said apertures in said housing is such that the rate of flow of refrigerant through said valve varies non-linearly as the degree of registry of said apertures changes.

22. The expansion valve according to claim 20 wherein the shape of said apertures of said plate and the shape of said apertures defined in said housing is such that the rate of flow through said valve varies linearly as the degree of registry of said apertures changes.

23. The expansion valve according to claim 14 further comprising means for limiting the axial movement of said actuator, said means for limiting the movement of said actuator being such that the actuator is not permitted to move to an extent which puts said apertures in said plate in full registry with said apertures defined in said housing, thereby limiting the amount of flow through said valve to an amount which is less than that which would occur if said apertures in said plate and said apertures in said means for defining a plurality of apertures in said valve were in full registry.

24. A refrigeration system comprising:
a compressor;
a condenser connected for flow to said compressor;
an evaporator connected for flow to said compressor; and
refrigerant metering means, disposed in flow communication with said condenser and said evaporator, said metering means including a motor, a rotating member defining a plurality of apertures, a fixed member defining a plurality of apertures and an actuator operably coupling said motor and said rotating member, said actuator first translating rotary motion of said motor to linear motion and then translating said linear motion to rotary motion of said plate, the degree to which said apertures in said rotating member are in registry with said apertures in said fixed member being determinative of the amount of refrigerant flow through said valve, said refrigerant metering means including means for limiting the movement of said actuator such that the actuator is prevented from rotating said rotating member to an extent which puts said apertures of said rotating member in full registry with said apertures of said fixed member thereby limiting the amount of refrigerant flow through said metering means to an amount which is less than the amount which would occur if said apertures of said fixed and rotating members were in full registry.

25. The refrigeration system according to claim 24, wherein the shape of said apertures in said fixed member and in said rotary member of said metering means are such that the rate of refrigerant flow through said metering means varies non-linearly as the degree of registry of said apertures changes.

26. The refrigeration system according to claim 24, wherein the shape of said apertures in said rotating and said fixed members of said metering means is such that the rate of refrigerant flow through said metering means varies linearly as the degree of registry of said apertures changes.

27. The refrigeration system according to claim 24, wherein said motor of said metering means has a threaded rotatable shaft, said shaft of said motor being in threadable engagement with said actuator.

28. The refrigeration system according to claim 24 further comprising bellows means disposed in said metering means, said bellows means being attached to said actuator for expansion and contraction in accordance with the direction of movement of said actuator, said motor drive shaft being disposed interior of said bellows means.

29. The refrigeration system according to claim 28 wherein said rotating member is spaced apart from said fixed member so that a leakage path between said rotating member and said fixed member is maintained even when said apertures of said rotating member and said apertures of said fixed member are out of registry, said rotating member, said fixed member and said actuator being disposed in a plane generally perpendicular to the flow of refrigerant through said valve, movement of said actuator and said rotating member in said valve likewise being in a plane perpendicular to the direction of refrigerant flow through said metering means.

* * * * *